(12) United States Patent
Barry et al.

(10) Patent No.: US 11,265,175 B2
(45) Date of Patent: Mar. 1, 2022

(54) APPARATUS AND METHOD FOR PROVIDING AUTHENTICATION, NON-REPUDIATION, GOVERNED ACCESS AND TWIN RESOLUTION FOR DATA UTILIZING A DATA CONTROL SIGNATURE

(71) Applicant: Zenotta Holding AG, Zug (CH)

(72) Inventors: Roelof Louis Barry, Hermanus (ZA); Andrew Charles Kessler, Hermanus (ZA)

(73) Assignee: Zenotta Holding AG

( * ) Notice: Subject to any disclaimer, the term of this patent is extended or adjusted under 35 U.S.C. 154(b) by 349 days.

(21) Appl. No.: 16/458,951

(22) Filed: Jul. 1, 2019

(65) Prior Publication Data

US 2020/0007345 A1   Jan. 2, 2020

Related U.S. Application Data

(60) Provisional application No. 62/692,199, filed on Jun. 29, 2018, provisional application No. 62/758,121, filed on Nov. 9, 2018.

(51) Int. Cl.
*H04L 9/32* (2006.01)
*G06F 16/23* (2019.01)

(52) U.S. Cl.
CPC ........ *H04L 9/3252* (2013.01); *G06F 16/2365* (2019.01); *H04L 2209/34* (2013.01)

(58) Field of Classification Search
CPC ... H04L 9/3252; H04L 2209/34; H04L 29/06; G06F 16/2365; G06F 21/62; G06F 21/64; G06F 21/10

(Continued)

(56) References Cited

U.S. PATENT DOCUMENTS 5,608,800 A * 3/1997 Hoffmann ............ H04L 9/3247
  713/150
6,823,076 B2 * 11/2004 Cahill ................... G06T 1/0028
  380/54

(Continued)

FOREIGN PATENT DOCUMENTS

EP   3226165 A1 * 11/2017 ........... B29C 64/386

OTHER PUBLICATIONS

International Search Report and Written Opinion dated Oct. 2, 2019, for PCT Application No. PCT/EP2019/067640, filed on Jul. 1, 2019, 9 pages.

*Primary Examiner* — Kambiz Zand
*Assistant Examiner* — Mahabub S Ahmed
(74) *Attorney, Agent, or Firm* — Cooley LLP

(57) ABSTRACT

A non-transitory computer readable storage medium has instructions executed by a processor to receive an original collection of symbols. A single use coding function is applied to the original collection of symbols to form a new collection of symbols. Encryption keys associated with a user are formed. The new collection of symbols is encrypted to form a recoded encrypted symbol file stored at a network accessible memory location. A distributed ledger entry with a data control signature is formed using the single use coding function encrypted with a private key. The distributed ledger entry is written to a distributed ledger.

The distributed ledger entry is accessed. The recoded encrypted symbol file is read from the network accessible memory location. The data control signature and a symmetric key are used to convert the recoded encrypted symbol file to the original collection of symbols.

11 Claims, 5 Drawing Sheets

(58) Field of Classification Search
USPC .......................................................... 713/176
See application file for complete search history.

(56) References Cited

U.S. PATENT DOCUMENTS

| | | | | |
|---|---|---|---|---|
| 7,003,666 | B1* | 2/2006 | Inoue | G06T 1/005 |
| | | | | 713/176 |
| 7,111,167 | B1* | 9/2006 | Yeung | G06F 21/16 |
| | | | | 380/30 |
| 8,489,880 | B1* | 7/2013 | Gagnon | H04L 9/3231 |
| | | | | 713/176 |
| 10,594,689 | B1* | 3/2020 | Weaver | H04L 9/3239 |
| 2004/0052375 | A1* | 3/2004 | Craft | H04L 9/0662 |
| | | | | 380/256 |
| 2008/0082828 | A1* | 4/2008 | Jennings | H04L 9/3247 |
| | | | | 713/176 |
| 2008/0273693 | A1* | 11/2008 | Au | H03M 7/40 |
| | | | | 380/28 |
| 2011/0286594 | A1* | 11/2011 | Resch | G06F 11/10 |
| | | | | 380/46 |
| 2012/0191978 | A1* | 7/2012 | Little | H04L 63/0478 |
| | | | | 713/176 |
| 2015/0163055 | A1* | 6/2015 | Hayton | H04L 9/0838 |
| | | | | 713/168 |
| 2015/0295720 | A1* | 10/2015 | Buldas | H04L 9/3263 |
| | | | | 713/176 |
| 2016/0092492 | A1* | 3/2016 | Zimmer | H03M 7/6064 |
| | | | | 707/693 |
| 2016/0197899 | A1* | 7/2016 | Liu | H02M 3/07 |
| | | | | 713/176 |
| 2017/0116693 | A1 | 4/2017 | Rae et al. | |
| 2017/0126702 | A1* | 5/2017 | Krishnamurthy | H04L 63/123 |
| 2017/0364701 | A1* | 12/2017 | Struttmann | G06F 16/2282 |
| 2018/0089729 | A1* | 3/2018 | Metnick | G06Q 20/409 |
| 2018/0197089 | A1* | 7/2018 | Krasser | G06F 21/56 |
| 2018/0205552 | A1* | 7/2018 | Struttmann | H04L 9/3242 |
| 2018/0301140 | A1* | 10/2018 | Turcott | G09B 21/004 |
| 2018/0364917 | A1* | 12/2018 | Ki | G06F 12/0246 |
| 2019/0129893 | A1* | 5/2019 | Baird, III | G06F 16/2471 |
| 2019/0132350 | A1* | 5/2019 | Smith | G06F 16/2379 |
| 2019/0207754 | A1* | 7/2019 | Iyer | H04L 9/085 |
| 2019/0273510 | A1* | 9/2019 | Elkind | G06F 8/74 |
| 2019/0377889 | A1* | 12/2019 | Mertens | H04L 9/0825 |
| 2020/0134616 | A1* | 4/2020 | Rafalko | G06Q 20/02 |
| 2020/0327421 | A1* | 10/2020 | Bathe | G06N 3/123 |
| 2020/0349142 | A1* | 11/2020 | Padmanabhan | G06F 16/27 |
| 2021/0026599 | A1* | 1/2021 | Bartolucci | H03M 7/70 |

\* cited by examiner

| UNIQUE MORSE CODE LIKE CODING TABLE 1<br>S • ▬<br>O ▬ • • • | INPUT:<br>SOS | OUTPUT:<br>• ▬ ▬ • • • • ▬ Twin(1) |
| --- | --- | --- |
| UNIQUE MORSE CODE LIKE CODING TABLE 2<br>S ▬ • ▬ •<br>O ▬ • • | SOS | ▬ • ▬ • ▬ • • ▬ • ▬ • Twin(2) |
| UNIQUE MORSE CODE LIKE CODING TABLE 3<br>S • • ▬<br>O • • • ▬ | SOS | • • ▬ • • • ▬ • • ▬ Twin(3) |
| UNIQUE MORSE CODE LIKE CODING TABLE 4<br>S • ▬ ▬<br>O ▬ • • ▬ | SOS | • ▬ ▬ ▬ • • ▬ • ▬ ▬ Twin(4) |

APPARATUS AND METHOD FOR PROVIDING AUTHENTICATION, NON-REPUDIATION, GOVERNED ACCESS AND TWIN RESOLUTION FOR DATA UTILIZING A DATA CONTROL SIGNATURE

CROSS-REFERENCE TO RELATED APPLICATIONS

This application claims priority to U.S. Provisional Patent Application Ser. No. 62/692,199, filed Jun. 29, 2018 and U.S. Provisional Patent Application Ser. No. 62/758,121, filed Nov. 9, 2018, the contents of each application are incorporated herein by reference.

FIELD OF THE INVENTION

This invention relates generally to data access control in computer networks. More particularly, this invention is directed toward techniques for providing authentication, non-repudiation, governed access and twin resolution for data utilizing a data control signature.

BACKGROUND OF THE INVENTION

A distributed ledger is a consensus of replicated, shared and synchronized digital data distributed across multiple networked machines. There is no central administrator or centralized data storage. A peer-to-peer network and consensus algorithms are used to ensure replication across the multiple networked machines. One form of distributed ledger is the blockchain system.

A traditional blockchain can accept a hash of an off-chain data resource. However the off-chain data resource is not governed from the blockchain. While the blockchain entry can verify the content of some data at a later stage, the resource can be accessed, copied, read without needing the permission or interaction with the blockchain entry. Thus, no governance of the off-chain resource can be programmatically enforced or automated. Instead, human intervention and labor are required for governance. Current blockchain technologies cannot accept data beyond a maximum capacity limit of a few hundred bytes.

Thus, there is a need to control off-chain data. More particularly, there is a need for arbitrary sized data files to be placed under blockchain governance.

SUMMARY OF THE INVENTION

A non-transitory computer readable storage medium has instructions executed by a processor to receive an original collection of symbols. A single use coding function is applied to the original collection of symbols to form a new collection of symbols. Encryption keys associated with a user are formed. The new collection of symbols is encrypted to form a recoded encrypted symbol file stored at a network accessible memory location. A distributed ledger entry with a data control signature is formed using the single use coding function encrypted with a private key. The distributed ledger entry is written to a distributed ledger.
The distributed ledger entry is accessed. The recoded encrypted symbol file is read from the network accessible memory location. The data control signature and a symmetric key are used to convert the recoded encrypted symbol file to the original collection of symbols.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
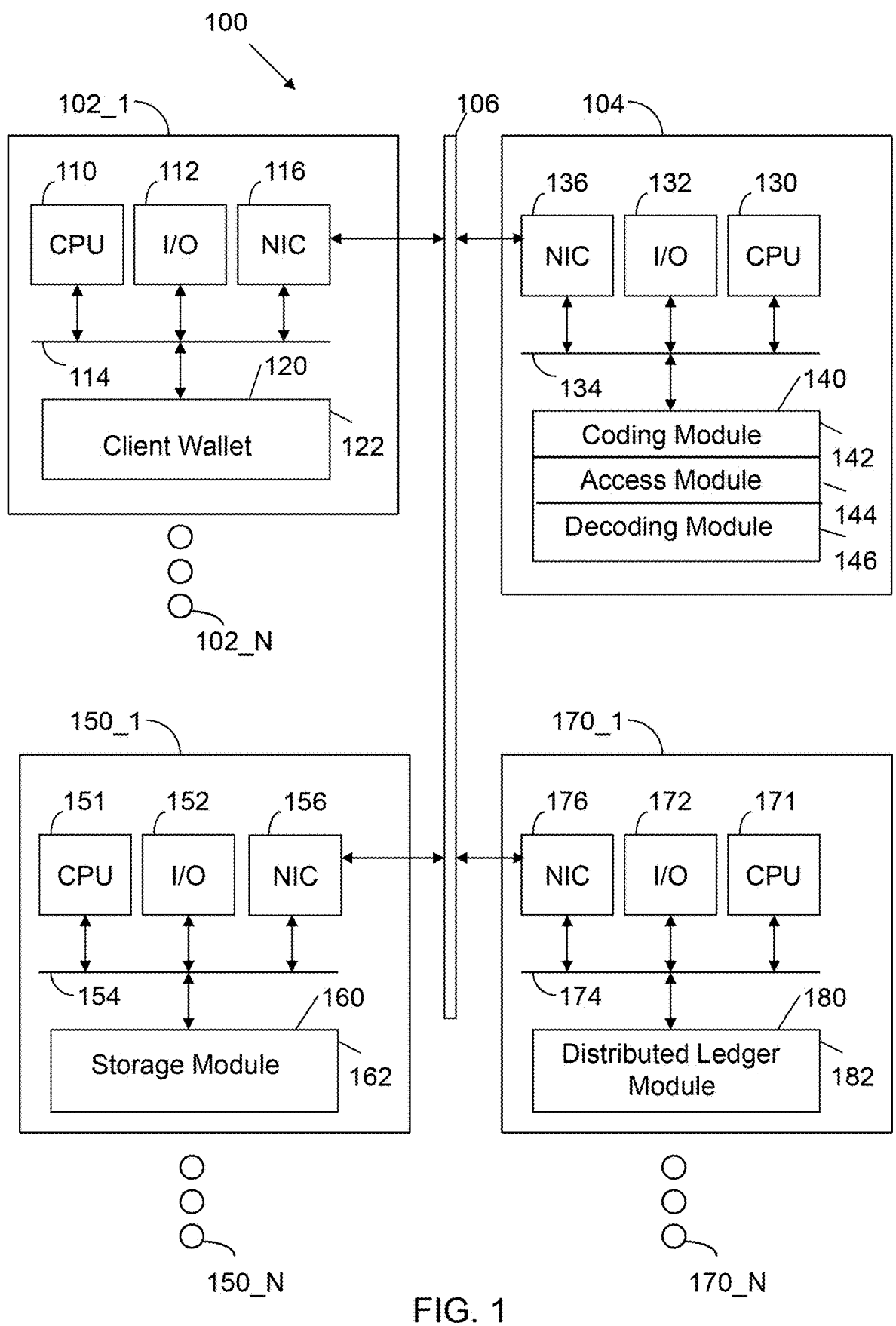
FIG. 1 illustrates a system configured in accordance with an embodiment of the invention.

FIG. 1 illustrates a system 100 configured in accordance with an embodiment of the invention. The system 100 includes a set of client machines 102_1 through 102_N operative as a peer-to-peer network utilizing network 106, which may be any combination of wired and wireless networks. As detailed below, the client machines access arbitrarily sized data files that are under blockchain governance.

Each client machine includes a processor (e.g., central processing unit) 110 and input/output devices 112 connected via a bus 114. The input/output devices 112 may include a keyboard, mouse, touch display and the like. A network interface circuit 116 is also connected to the bus 114 to provide connectivity to network 106. A memory 120 is also connected to the bus 114. The memory stores a client wallet 122 with instructions executed by processor 110 to implement operations disclosed herein.

Also connected to network 106 is a server 104. The server includes a processor 130, input/output devices 132, a bus 134 and a network interface circuit 136. A memory 140 is connected to bus 134. In one embodiment, the memory stores a coding module 142, an access module 144 and decoding module 146. Modules 142, 144 and 146 may be downloaded to client devices 102_1 through 102_N and form a portion of a client wallet 122.

FIG. 1 also illustrates a set of machines 150_1 through 150_N operative as data storage machines or cloud storage. Each machine 150 includes a processor 151, input/output devices 152, a bus 154 and a network interface circuit 156. A memory 160 is connected to bus 154. The memory 160 stores a storage module 162 with instructions executed by processor 151 to manage the reading and writing of data blocks.

FIG. 1 also illustrates a set of machines 170_1 through 170_N operative as a distributed ledger. Each machine 170 includes a processor 171, input/output devices 172, a bus 174 and a network interface circuit 176. A memory 180 is connected to bus 174. The memory 180 stores a distributed ledger module 182 with instructions executed by processor 171 to administer a distributed ledger.

The system 100 is exemplary. It should be appreciated that operations disclosed herein may be performed on different machines in the system 100. For example, a client machine 102 may include a storage module 162 to store blocks of data. Similarly, one or more of machines 170_1 through 170_N may include a storage module 162 to store blocks of data.

Figure 2:
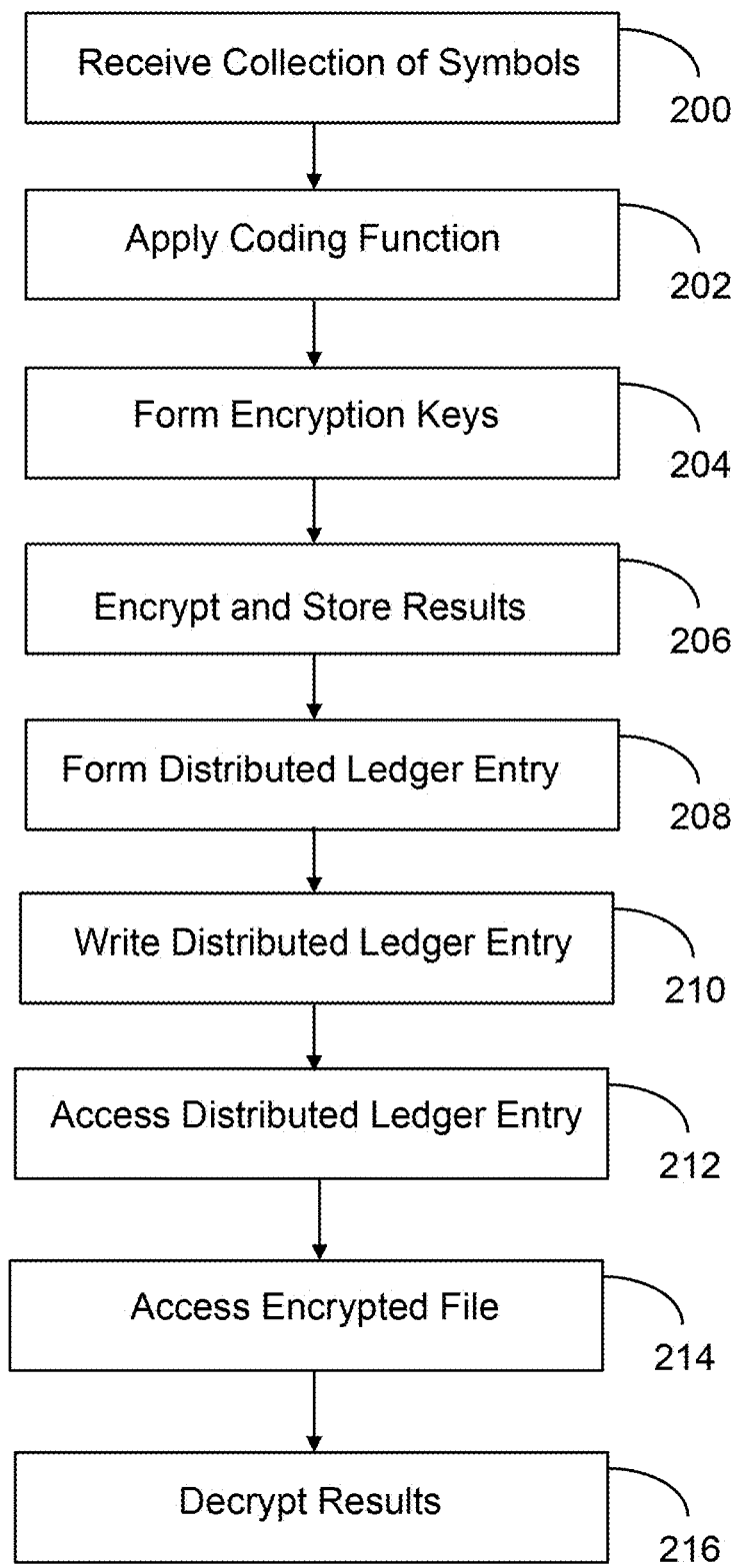
FIG. 2 illustrates processing operations associated with an embodiment of the invention.

FIG. 2 illustrates processing operations associated with an embodiment of the invention. Initially, a collection of symbols is received 200. The collection of symbols form a data file. By way of example, client machine 102_1 receives a collection of symbols.

Figures 3, 4:
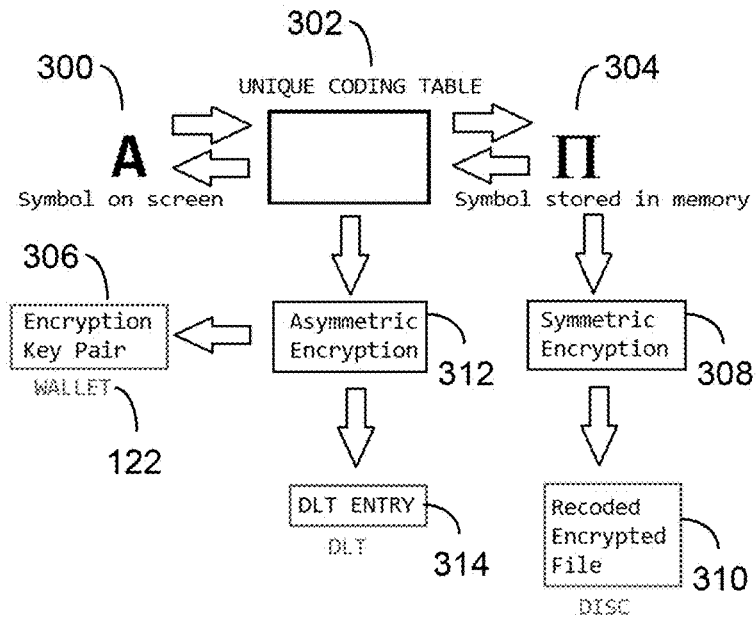
FIG. 3 illustrates data processing performed in accordance with an embodiment of the invention.
FIG. 4 illustrates encoding operations performed in accordance with an embodiment of the invention.

A coding function is applied to the collection of symbols 202. FIG. 3 illustrates a single symbol 300 that is subject to a coding function in the form of a unique coding table 302, which produces a new symbol 304. The operation of block 202 forms a new collection of symbols. The client wallet 122 may utilize the coding module 142 received from machine 104 to implement this operation.

The next operation is to form encryption keys 204. Three encryption keys are formed: an asymmetric encryption private key, an asymmetric encryption public key and a symmetric encryption key. FIG. 3 illustrates a client wallet 122 of a client machine 102 holding an encryption key pair 306.

The next operation of FIG. 2 is to encrypt and store results 206. More particularly, this operation entails encrypting the new collection of symbols to form a recoded encrypted symbol file, which may be stored utilizing a storage module 162 on one or more of machines 150_1 through 150_N. FIG. 3 illustrates a symmetric encryption block 308 forming a recoded encrypted symbol file 310. The client wallet 122 may utilize the coding module 142 received from machine 104 to implement this operation.

Returning to FIG. 2, the next operation is to form a distributed ledger entry 208. A private key may be used by an asymmetric encryption block 312 to form a distributed ledger entry 314, which will be referred to herein as a Distributed Ledger Technology (DLT) entry. The client wallet 122 may utilize the coding module 142 received from machine 104 to implement this operation. The distributed ledger entry is then written to memory 210. More particularly, the distributed ledger entry is written to a distributed ledger, such as on machines 170_1 through 170_N.

The foregoing operations constitute data encode, encrypt and write operations. The following operations constitute data read, decrypt and decode operations. The next operation of FIG. 2 is to access the distributed ledger entry 212. For example, the client wallet 122 may use the access module 144 received from machine 104 to implement this operation. Next, the encrypted file is accessed 214. More particularly, the recoded encrypted symbol file is accessed from a network accessible memory location. For example, a data vendor may specify to a data purchaser the location of the network accessible memory location.

The final operation of FIG. 2 is to decrypt the results 212. More particularly, the recoded encrypted symbol file is decrypted to derive the original collection of symbols. As discussed below, the decrypt operation includes a decoding operation, which is the inverse of the coding function of block 202. The decoding module 146 received from machine 104 may form a portion of the client wallet 122 that is used to implement this operation.

The disclosed technology constitutes a technique to control off-chain data. More particularly, arbitrarily sized data files are placed under blockchain governance. Additional details regarding the disclosed technology follow.

In economics, a good is said to be rival if its consumption by one consumer prevents simultaneous consumption by other consumers, or if consumption by one party reduces the ability of another party to consume it. When creating lists, databases, ledgers and other such data structures a field is a variable such as "height", "age", "name" etc. and a field value is the corresponding entry such as "1.2 meters", "37 years", "John Smith" etc. A similar concept is a key: value pair, but because key has a variety of meanings in a cryptographic sense as well, reference to field: value pairs is more helpful. Primary field values are guaranteed to be unique to enable looking up entries that could be duplicated. For example John and Mike may both have $100 in a bank and so to be sure that Mike is spending his $100 and not John's, a Primary field value such as an ID number or password can be used to ensure good working of a ledger, database or the like.

Current blockchain ledgers provide a network defined space were users Alice and Bob can record short messages between each other (peer-to-peer) that are attested by the network (attestation is specifically performed by those individuals that hold a copy of the ledger for the purpose of providing a neutral distributed third party copy of the message Alice sent to Bob). Because of the cryptographic protocols employed combined with the proof of work/consensus protocol of the crypto network, Alice and Bob's record is both socially, economically and technically hard to edit or manipulate.

A benefit of current block chain technology is that message entries "on" the ledger are owned. These short messages have properties (such as rival character) that technically enforce ownership and provide a partial move towards legal ownership. As such, if these messages are set to represent tokens, then tokens can be owned and traded over a blockchain network using the appropriate protocol. Token transactions are efficient because they are peer-to-peer and do not need authorization or auditing by a human to be valid.

The data associated with a field value is very different than the data associated with a file. Technologies that ensure the correct usage and movement of data as field—field value pairs (such as in a Structured Query Language (SQL)) do not ensure the correct usage and movement of files. Data held in a database is under database management, the same data held out of a database is not under database management. The same is true for blockchain and Distributed Ledger Technology (DLT) structures. Field values in a DLT are under DLT management, data associated with files are not under DLT management.

The disclosed technology provides DLT managed field values. That is, with the disclosed technology field values in a DLT are owned. DLT field values have properties (such as rival character) that technically enforce ownership and provide a partial move towards legal ownership. As such, if these DLT field values are set to represent tokens, then tokens can be owned and traded over a blockchain network using the appropriate protocol.

Field value transactions are efficient because they are peer-to-peer and do not need authorization or auditing by a human or organisation in order to be valid. The disclosed technology includes a file management system that extends and preserves the utility of DLT field value management. A valid ownership model for files is disclosed. DLT field values have no utility out of a DLT environment and ledger. Access to a DLT field value requires access to the DLT network and possession of a cryptographic key. Access to a file does not require access to the DLT network and therefore is not under DLT management with respect to ownership, which in turn necessitates labor based auditing etc. At best, through the use of hash values, the integrity of data can be established from a DLT, but that is a utility not at the heart of DLT field value utility. With current DLTs, files associated with hash integrity checkers certainly do not possess rival character required for ownership at a "property" level, nor do they enable access for the asset at a DLT level and therefore fail to provide intellectual property protection for assets registered in current DLTs.

Furthermore, DLT field values are guaranteed to be primary field values during transactions. This is not the case for files during DLT file transactions as the hash of a duplicate file will be identical and not unique. Therefore, uniqueness will have to be introduced at the cryptographic key level requiring a Public Key Infrastructure and still not be able to identify file copy A from file copy B when presented to a judge thus failing to offer a peer-to-peer transaction platform for files.

These challenges are met in a single, integrated protocol referred to as The Magna Carta Protocol (MCP), which does not require an amendment to DLTs, but rather a reformatting of a file data utilizing MCP. The MCP produces a decentralised file format.

The coding function 202 of FIG. 2 may utilize the unique coding table 302 of FIG. 3. The coding function can alternately be a tree. The only requirement is that one coding scheme be used per file encoding, such that the coding scheme is single use only. That is, single use means use for a single instance of a file, not only good for one use in time. If duplicate files are coded multiple times, a new one time coding scheme must be generated with each encoding request. Three relevant examples of suitable single use coding schemes are Huffman trees, auto-encoders and symmetric encryption (Ceasar ciphers, AES, etc.).

Huffman trees are discussed because certain aspects of the MCP operation are easily modelled and understood. Reasons for using symmetric encryption instead of Huffman trees are speed of encoding. Reasons for using Huffman trees may be faster streaming. Auto-encoders may be used on images and generally incompressible strings. The main feature of all three encoder models is that the input can be salted to produce unique coding schemes without having to artificially generate unique coding schemes.

MCP produces a recoded encrypted file on disc, beyond the DLT network, which cannot be accessed without rebuilding the unique coding scheme which requires accessing the DLT entry. In other words the DLT entry under MCP is acting as a pointer in DLT memory to the offchain file. The pointer both identifies the recoded encrypted file and provides a way to access the cold stored content. This controlled access gives recoded encrypted files rival character.

FIG. 4 is used to demonstrate the notion of guaranteed uniqueness. If the MCP chooses to employ a unique Morse Code coding schemes shown in FIG. 4, it is clear that the same input or message when encoded, repeatedly generates a different "twin". The Unique coding table and the unique output work together. While all twins build to the message "SOS" when read (looks the same on build) each twin is different in its record.

The encrypted unique encoding scheme can be paired with an integrity checker value if the content under DLT management is static. The integrity checker value can be set to zero if the data under management is dynamic, such as messaging applications or streaming services.

Field value transactions under MCP can record the transfer of ownership of one file between two peers in a peer-to-peer manner. Thus, the disclosed technology facilitates an entirely autonomous peer-to-peer transfer of owned files.

The invention is more fully appreciated in the context of the following detailed disclosure. In cryptography, plaintext is unencrypted information, as opposed to information encrypted for storage or transmission. Plaintext usually means unencrypted information pending input into cryptographic algorithms, usually encryption algorithms.

Cipher text or cypher text is the result of encryption performed on plaintext using an algorithm called a cipher. Cipher text is also known as encrypted or encoded information because it contains a form of the original plaintext that is unreadable by a human or computer without the proper cipher to decrypt it.

A coding scheme is any table, tree, function, or representation that maps binary to some character or value. ASCII is a table that maps the binary "1000001" to the capital letter "A" and is thus a coding scheme. Encoding is the process of converting a character or value into binary while decoding is the process of converting binary into some character or value. Although coding schemes are certainly not encryption ciphers, the definition of a coding scheme in this disclosure depends on how an algorithm is applied, not necessarily what algorithm is chosen. For example, most substitution ciphers such as Caesar cipher encryption produce outputs with similar characteristics to encoding outputs such as the base64 encoding of UTF8 HTML. Similarly, the Huffman process detailed in this document has the properties of a compression algorithm and a coding scheme. Within this document the Huffman process is often referred to as a coding scheme as it is the properties of Huffman coding that are critical to the disclosed Digital Control Signature (DCS) process described below, while the Huffman compression, a beneficial side effect, is merely managed.

Public key cryptography uses pairs of keys. The keys include public keys, which are disseminated widely and private keys, which are known only to the owner.

In cryptography, salt is random data that is used as an additional input to a one-way function that "hashes" a password or pass phrase. Salt is closely related to the concept of a nonce. The primary function of salt is to defend against dictionary attacks or against its hashed equivalent, a pre-computed rainbow table attack.

A digital signature is a mathematical scheme for demonstrating the authenticity of digital messages or documents. A valid digital signature gives a recipient reason to believe that the message was created by a known sender (authentication), that the sender cannot deny having sent the message (non-repudiation), and that the message was not altered in transit (integrity).

In this disclosure, a message is denoted by a capital "M". A message is any string of data. "M" means a serial number, data base entry, numerical value, file content, in memory value of any type or size or anything that can be represented using binary.

As discussed in connection with FIG. 4, twin resolution is the ability to distinguish two or more identical copies of a message from one another.

MCP facilitates the creation of data embedded with authentication, non-repudiation, tunable integrity, governed access and twin resolution by default, referred to as smart data. MCP also facilitates the transmission of smart data between two or more parties in a peer-to-peer network.

Figure 5:
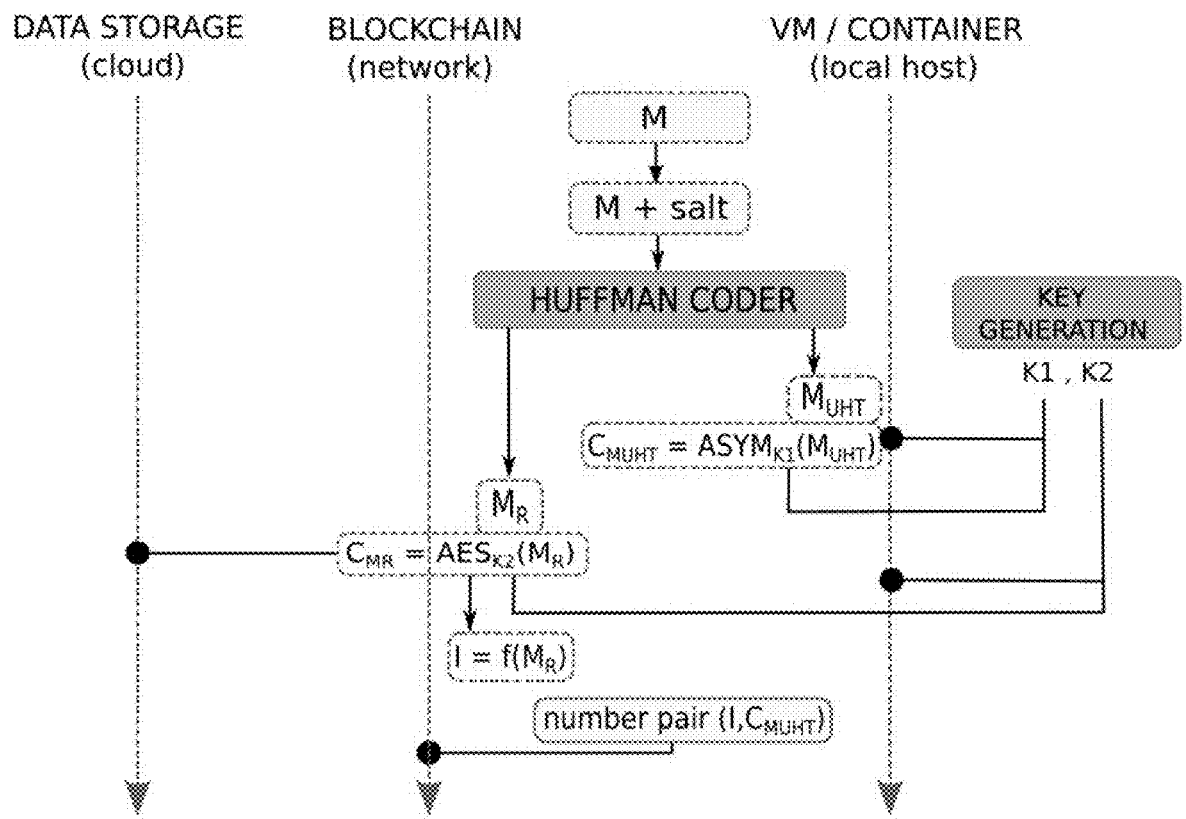
FIG. 5 illustrates data write processing operations performed in accordance with an embodiment of the invention.

Plaintext data (referred to as a message, M) is converted by the MCP into a decentralized file format consisting of three components detailed in FIG. 5:

a Data Control Signature (DCS)—comprising the number pair (I, CMUHT)

a recoded encrypted data object—the ciphertext CMR cryptographic keys—K1, K2.

Taken collectively, these three components of the decentralized file format are referred to as Smart Data. The location of each component varies by application, but typically the DCS is stored on a blockchain (e.g., machines 170_1 through 170_N), the recoded encrypted data object (CMR) is suitable for cloud storage (e.g., machines 150_1 through 150_N) and the cryptographic key pair K1, K2 is stored in a Virtual Machine (VM) or container based wallet (e.g., on a client machine 102_1).

The primary purpose behind smart data's design is to overcome the limits of conventional data to be both controllable and collaborative at the same time, a problem that stems from the fact that currently data is accessible by default and copies of data are indistinguishable from one another.

FIG. 5 characterizes the processing and decentralization of a data message M. The first half of the MCP is designed to ensure that all data is unique at a binary level even between two exact copies of any given data, as shown in connection with FIG. 4. The ability to uniquely identify smart data is called twin resolution and is critical in establishing digital rights, audits and ownership of data in a world where multiple copies of exact content are distributed globally on a daily basis.

The second half of the MCP is designed to make data objects unreadable and then encrypted placing them into a state referred to as cold storage. This measure ends root level file access ensuring data is inaccessible by default.

The ability of a user/agent or application to retrieve smart data requires both the wallet held keys (e.g., encryption key pair 306) and the blockchain entry (e.g., DLT entry 314). This is in stark contrast to a smart contract where the blockchain does not determine the usability of a smart contract, only its validity. Smart contracts govern tokens of value, whereas Smart data is a store of value itself.

Access to information within a smart contract is not restricted to a blockchain base, meaning that a legal position of ownership of the data within a smart contract is not complete. The ownership of Ether is set, but not the data within the smart contract itself.

In contrast, with the disclosed technology, the ability of a user/agent or application to retrieve smart data requires both the keys held by the wallet and the blockchain entry value $C_{MUHT}$. The DCS $C_{MUHT}$ confirms from a blockchain base that the content held within the $C_{MR}$ file is accessible. Without the $C_{MUHT}$ value, the content of the $C_{MR}$ file is inaccessible. This is in stark contrast to a smart contract, where the smart contract blockchain does not determine the usability/accessibility of a smart contract, only its validity.

FIG. 5 illustrates processing of plaintext data M. For example, M is taken out of static ASCII, UTF-8, Unicode coding or whatever coding standard is used which universally represents any character (such as the letter A as 100001) the same way regardless of larger context of M, and puts M into a custom coding scheme, which will be referred to as a Unique Huffman Tree (UHT). Theoretically, a Huffman encoder can be configured to handle all M identically and produce constant tree structures for a fixed M. The MCP goes against this traditional implementation to maximize the number of distinct trees that can represent symbols within a message. This aspect of the MCP seeks to maximize the distance between any two consecutive requests to generate a tree for a fixed message M in a random fashion, to maximize the efficacy of twin resolution.

In one embodiment, Unique Huffman Trees are generated using two mechanisms, random stack returns and salt. In UTF-8, all bytes have an 8-bit word size. Within Huffman coding, byte word size is variable resulting in message length compression. By allowing the stack to randomly return binary word addresses to match to symbols of similar frequency up to 2000 unique Huffman trees can be generated on a 10 kb message (or larger) before statistical collision.

Salting a message decreases compression efficiency, but increases twin resolution. For a standard 100 kb file or larger, 5% L salt can easily uniquely resolve millions of message copies. Increasing the salt length will increase twin resolution power, but ineffectively recode messages in terms of storage size, which is why a balance of salt amount must be set. 5% salt typically maintains a compression efficiency of 99% efficiency against the ability to resolve 4-8 million message twins without collision. For two messages M1, M2 made up of uniform symbols frequencies, the odds of collision are 256!/2 or on the order of 4 E+506. However, a lower bound for highly structured messages could be significantly smaller. Collision detection through empirical means requires somewhat exhaustive computation. The bound then for salted messages at 5% message length allows random stack returns greater than 100,000 and less than 4 E+506, which is sufficient to make the claim of effective twin resolution.

FIG. 5 illustrates that M is supplemented with salt to produce "M+salt", which is applied to a Huffman Coder. This corresponds to the coding function block 202 of FIG. 2 and the coding table 302 of FIG. 3. As shown in FIG. 5, the coding function produces $M_{UHT}$ rand $M_R$. The "R" in $M_R$ stands for recoded, as in the recoded message M. UHT stands for Unique Huffman Tree derived from the message M. The message M provides a symbol set to generate UHT. The message derived $M_{UHT}$ is the unique coding function. It recodes message M to $M_R$.

$M_{UHT}$ is asymmetrically encrypted with a private key K1 to produce $C_{MUHT}$. This corresponds to the encrypt operation 206 of FIG. 2 and the asymmetric encryption block 312 of FIG. 3. As shown in FIG. 5, $C_{MUHT}$ forms a number pair that is stored to the blockchain (e.g., machines 170_1 through 170_N).

FIG. 5 also depicts that message $M_R$ is symmetrically encrypted with a public key K2. This corresponds to the encrypt operation 206 of FIG. 2 and the symmetric encryption block 308 of FIG. 3. This results in a recoded encrypted file 310 or $C_{MR}$, which may be stored via a network (e.g., a network accessible memory location on one or more of machines 150_1 through 150_N).

In the last half of the Magna Carta Protocol we set the keys, the data control signature and the recoded encrypted data object. A prerequisite for these steps is the generation of the key pair K1, K2. The need for non-repudiation of the $C_{MUHT}$ requires the implementer's to choose K1, which is an asymmetric cipher used with "signature" schemes. K2 is a public key that supports symmetric encryption. Though the choice of asymmetric or symmetric ciphers for the encryption of the UHT recoded message from M to $M_R$ is arbitrary, for speed performance we assume a symmetric operation such as AES-256 running.

The plaintexts $M_{UHT}$ and $M_R$ are encrypted accordingly to the resultant ciphertexts $C_{MHUT}$ and $C_{MR}$. At this stage in the MCP the recoded encrypted data object ($C_{MR}$) is set. The number pair (I, $C_{MHUT}$) is set as part of a two-step process.

A data control signature (DCS) is similar in concept to a digital signature, but with significant differences and additions. A data control signature (DCS) is a mathematical scheme for demonstrating authentication, non-repudiation and also providing message accessibility and twin resolution as novel components.

Integrity is processed as a final optional step to generate the number "I". Integrity is a property of data that confirms no alterations have occurred to data during transmission or after storage by some third-party. In other words, data has integrity if when examined at some distant location or time it can be shown to be unaltered. Data of this type is immutable. Integrity is not set through accessibility in any form; data can have integrity and still uncontrolled access.

This is the case with a smart contract. The smart contract hash value stored on Ethereum's ledger convinces some distant judge that the smart contract in question is valid and has integrity, but anyone can access it, and therefore ownership of information within a smart contract is not owned.

Traditional hash-based integrity is straightforward enough to implement, but has a drawback in terms of risking future exposure of information. Future generations capable of incredible hash brute forcing will be able to deduce the information stored on such a hash based blockchain.

The lack of access control and the potential future weakness in blinding or protecting sensitive data is the reason why the disclosed technology presents integrity setting options that do not employ raw hashing.

Accessibility of smart data is set through removing the readability of data (through the Huffman coder) as well as encryption. Data streaming over UDP does not require an "I" value to be set, while a fixed data product such as pre-recorded entertainment does. As such, a DCS allows dynamic content to be authenticated, non-repudiated, twin resolved, and accessed without limiting the ability to reuse a DCS in a messaging or streaming application.

When the setting of integrity is appropriate (such as for static smart data products) the below integrity methods are useful and future-proof "I" is a value to determine data integrity. Broadly, there exists some function "I" depending on $M_R$ that sets integrity. Traditionally, a straight hash function would be sufficient. To understand why a straight hash is not used it is important to stress a significant feature of the number pair (I, $C_{MHUT}$).

(I, $C_{MHUT}$) constitutes the blockchain resident component of smart data. Blockchain records persist globally and as such need to be future-proof. Although crypto analysis gives us reasonable assurances regarding suite B cryptographic ciphers, quantum computing and massive parallel processing does not guarantee the HASH or encrypted values stored on the blockchain will remain private over the course of time.

The requirement of data to remain private over time is solved in smart data because there is no information of $M_R$ encoded onto the blockchain, just proof of $M_R$ integrity and control over $M_R$ access. It is not enough that hash functions are lossy; therefore three integrity alternatives are mentioned briefly.

Authenticated encryption (AE) and authenticated encryption with associated data (AEAD, variant of AE) is a form of encryption which simultaneously provides confidentiality, integrity, and authenticity assurances on the data. These attributes are provided under a single, easy to use programming interface.

Figure 6:
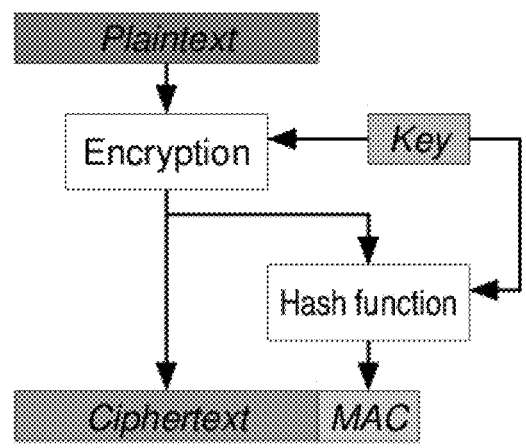
FIG. 6 illustrates data encoding performed in accordance with an embodiment of the invention.

An encrypt-then-MAC (EtM) approach may also be used. That is, the plaintext message is first encrypted, then a MAC (Machine Authentication Code) is produced based on the resulting ciphertext. The ciphertext and its MAC are sent together in traditional AE protocols used in e.g., IPsec. This is the only method which can reach the highest definition of security in AE, but this can only be achieved when the MAC used is "strongly unforgeable". The foregoing process is shown in FIG. 6.

When DCS employs AE to set integrity, the machine authentication code (MAC) is separated from the encrypted recoded message $C_{MR}$ and is stored on the blockchain as part of the DCS. Importantly, without the K1 key stored in the VM, integrity checks cannot be performed as the K1 and the message are needed to generate the MAC.

Therefore all 5 DCS attributes—authentication, non-repudiation, integrity, twin resolution, and message access—are controlled strictly by the message owner.

An alternative integrity algorithm is disclosed for completeness. For small messages (e.g., less than 50 megabytes) that need the highest levels of extreme integrity (such as a national edict or legal document) miners can be brought in as "co-signers".

AE, described above, provides integrity that is practically impossible to break. The disclosed solution of miner encryption with a throw away private key has the benefit of being physically impossible to break integrity.

The owner submits a re-coded message $M_R$ to an agent controlled by miner. The miner encrypts the recoded message through the agent with a private key K2, and private K2 is then permanently forgotten while the agent returns the K2 public key as the "I" value for the DCS.

Breaking integrity setting option 1 is practically impossible, as cheating the MAC requires both the hacking of the message author's VM to lift the MAC key, and also somehow editing the blockchain record of the MAC or forcing a useful hash collision during the MAC authentication process. This requires the failing of all known blockchain strength and security mechanisms on top of a specific VM wallet hack. While theoretically possible, it is not practically possible.

Integrity setting option 2 is both practically and theoretically impossible as the Private Key K2 has been forgotten; there is no record of it anywhere and nothing for an adversary to lift. An adversary would have no option but to attempt a brute force hack of the asymmetric cipher employed, which presents a trans-computational problem that ideally even a quantum computer would fail to execute in a reasonable time.

The creation of a file header recording metadata such as symbol frequencies, or interlaced stenographic markers based on $M_R$ content all provide increasing degrees of confidence in integrity without revealing or exposing $M_R$ content on the blockchain in a future-proof fashion. These three "I" type techniques all prevent the storing of $M_R$ content on the blockchain in any form towards a secure and privacy-centric future-proof smart data entry.

DCS Number pairs (I, $C_{MUHT}$) set the $C_{MR}$ file extension to *.ta while DCS Number pairs (null, $C_{MUHT}$) set the $C_{MR}$ file extension to *.dl. Set integrity denotes static "da.ta" *.ta, MUHT, while null integrity denotes a data line (*.dl). *.dl files contain nothing more than metadata the $C_{MR}$ content is generated on demand (such as a stream) using the blockchain's $C_{MUHT}$. The choice of $C_{MR}$ source therefore is arbitrary.

From a utility perspective *.ta files provide the world with smart data products, while *.dl files provide the world with smart data services. From an application perspective, *.ta files will typically reside under the control of one wallet and one user until a sale or transfer is made while *.dl files must be held by two parties and two wallets to have any utility.

Two users will undergo a key agreement protocol to establish a shared secret. Then they will agree on some arbitrary text so set a $C_{MUHT}$, which would constitute a tree agreement protocol. At this stage both parties, Alice and Bob, will have a set of keys and a $C_{MUHT}$ value stored on their respective local devices. Alice will now generate some content M, recode M with $C_{MUHT}$ and encrypt it to produce $C_{MR}$. $C_{MR}$ will be transferred to Bob, who will decrypt and decode to retrieve the message. To recap, the difference between *.ta and *.dl is the order in which the components are deployed between twoparties. *.ta plaintext messages exist before $C_{MUHT}$ transport, while *.dl plaintext messages exist after.

*.ta integrity prevents the reuse of $C_{MUHT}$ on future content, *.dl has no integrity and is reused until the user feels security measures justify creating a new *.dl data line. *.ta files are not necessarily collaborative, they may simply contain data meant for only one user. *.dl file necessarily involve 2 or more parties.

DCS is different from traditional digital signing schemes because the same message signature not only authenticates a message but can also allow the signature holder to control signed data. One such example of control is message ownership. Ownership rights are conferred to signed messages by default and are enforceable through algorithms, not simply through voluntary human compliance.

The Data Control Signature, which is mathematically represented as the number pair (I, $C_{MUHT}$), is recorded on the blockchain. The DCS $C_{MUHT}$ could be stored at any database equivalent storage structure which may include (but is not limited to) a Directed Acyclic Graph such as IOTA's Tangle, a SQL database, an XML table, a private blockchain or others. The DCS could even be printed and stored at some physical location and the signing scheme would still provide a complete offering as detailed below.

By using a straightforward unsalted Huffman message recoding scheme instead of hashing a message, we retain the ability to authenticate a message "M" (improved because authentication is pro-active, not retro-active as described below) and gain mathematically enforceable message access control. The use of Huffman coding schemes give the user a mechanism to enforce message access through the resultant signature.

A Huffman process is a compression method used to reduce a message length to the minimum possible length, which maximizes the plaintext's bit entropy from a symbol level analysis. The Huffman process takes a message "M" of character length "L", analyses the symbol frequency, and produces a Huffman Tree "HT" that can be used as a coding scheme to recode a message in an optimally compressed manner—$M_R$. Huffman trees depend on the content of the message, just as a hash depends on the content of a message.

Hashing algorithms used in traditional signing schemes are retroactive. If the same message is hashed with the same hashing algorithm then the same apparently random output is generated. This "random output" or hash—H(M)—serves as a sort of fingerprint that retroactively (after the fact) verifies that the target message is authentic and unchanged.

Coding schemes are pro-active. Coding schemes do not identify a message after analysis, building a readable message during the decoding process instead. Message dependent coding schemes (such as Huffman coding) authenticate a message by only being able to uniquely rebuild one specific target message, and at the same time providing access to message content by mapping some "apparently random" binary to a useful character or value.

To stress the point, it is possible to imagine an application that uses a Huffman Tree instead of ASCII or UTF-8 to read some Huffman encoded plaintext. The computational time would be comparable. By contrast, computing a hash first and then, if verified, running an application would require two individual computational processes.

Access and authentication is therefore concomitant. No matching of fingerprints is used to identify a message as unaltered, but rather message dependent coding schemes are used to produce a readable message that is unaltered from a binary base.

While message independent coding schemes (such as ASCII) identify characters or values from binary, they are not specific to messages as a whole, making them unsuitable in DCS signing schemes. A chief property of hash functions is that they depend on message content, ensuring that hash based signatures are tied to specific messages, assisting in non-repudiation and preventing forgery. Signatures that did not depend on message content and where identical could simply be copied and re-assigned to other illegitimate messages by unlawful third parties.

Huffman coding schemes, like hashing algorithms, depend on message content and are "unique" to messages as they depend on message content. All coding schemes that are based on message content or can be provably and uniquely tied to a single message in some way are suitable for use in DCS and are collectively referred to as unique coding schemes.

Considering the broad utility and application of DCS as a whole in commerce, law and application development the Huffman coding scheme is superior for many reasons, including compression and salting to produce strong twin resolution. Thus, while other unique coding schemes may be employed as Huffman process alternatives and still produce a workable Data Control Signing scheme, it is a Huffman process that is detailed and drawn in the provided examples. It should be noted strongly, however, that DCS is not dependent on the Huffman process specifically and can accept any process deemed to fulfil the function of a unique coding scheme. Indeed, the orthodox implementation of Huffman Trees is injective and has to be modified with random stack returns and salting to ensure the generation of Unique Huffman Trees—UHT as a non-injective function.

The Huffman coders maximize the entropy of a string. In a random coding scheme of variable word size you might make the message larger when recoding (ASCI has a fixed word size of 8 bits per character for all characters). Huffman gives no guarantee about word size, which is a plus because without the tree it is mathematically harder to know where a symbol starts or stops. Symbol "A" might have a word size of 9 bits, while symbol "B" might have a word size of 3 bits, you never know. Huffman mathematical principles are similar to the mathematical principles in JPEG compression. Therefore, as a compression module, it could become a way to allow media players to load a "one time Huffman codec" for pay per view, or streaming with very little computational overhead on the decode side.

Key generation introduces the need to demonstrate perfect forward secrecy which depends heavily on implementation of MCP. With respect to K1, in messaging applications, tree agreement protocols can be used. In distribution of content on-the-fly, Diffie-Hellman type key agreement or standard key encapsulation and transport can be used. With respect to K2, the appropriate choice of hybrid encryption for key encapsulation and transport is used. These issues lie in implementation and are beyond the general scheme for data treatment presented here. When Alice transmits smart data to Bob, the decentralized file format poses a technical challenge to handle each component in a relevant manner.

Figure 7:
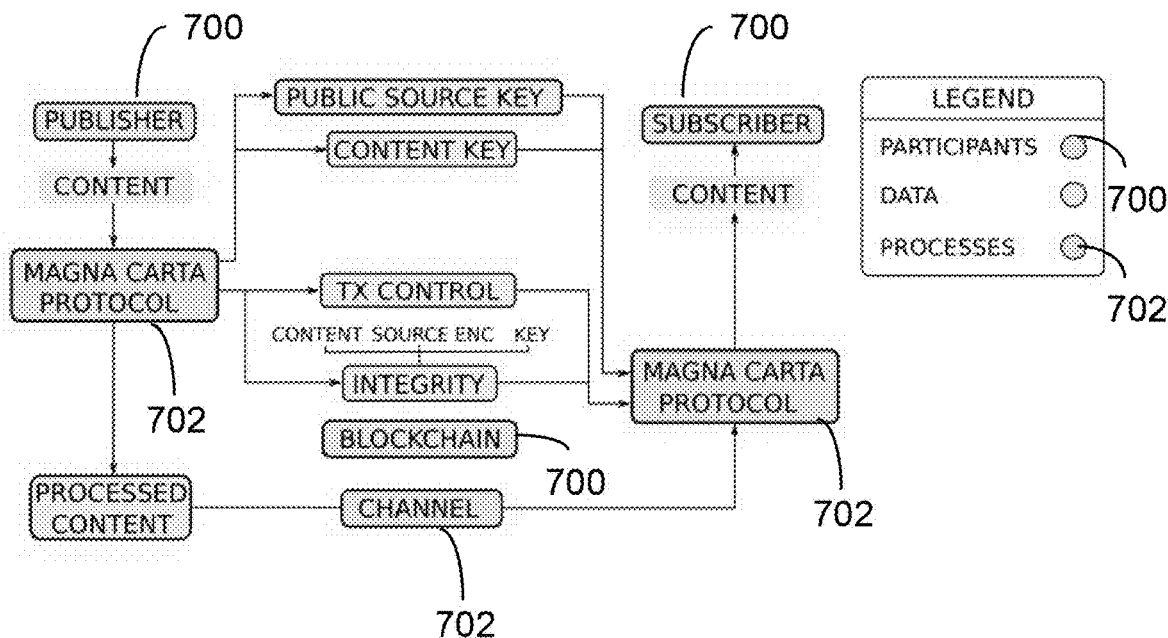
FIG. 7 illustrates interactions between users, data and processes associated with an embodiment of the invention.

FIG. 7 illustrates a smart data transfer process in accordance with an embodiment of the invention. Block 700 are participants, for example a publisher (e.g., Alice), a subscriber (e.g., Bob) and a blockchain operative as a blind broker that provides collaboration to both parties and control to the smart data owner. Blocks 702 represent processes, such as MCP and a channel. The remaining blocks in FIG. 7 represent data.

The DCS is simply transmitted from Alice to Bob using cryptographic mechanics on a distributed ledger, but is unique in that it is a second entry against tokens. Thus, the blockchain records the transfer of a smart data resource or asset against crypto tokens.

The significance of the two way entry is that it allows for Bob and Alice's financial transaction (payment for a smart data product or service) and the smart data transfer to be handled simultaneously while under different regulatory concerns. The smart data transfer is blind to everyone but Alice and Bob (enabling GDPR compliance) and can be forgotten, while the payment record cannot be forgotten and serves as a perfect financial record.

The DCS process is executed at the desired control point on the virtual machine VM as illustrated in FIG. 5, which is typically installed on some local host or local device. The message "M" has been signed resulting in 3 outputs namely: $C_{MR}$ (encrypted recoded message), number pair (I, $C_{MUHT}$) (the DCS), and keys K1 and K2. Unlike digital signature schemes that co-localize signatures and messages, the DCS deliberately ensures decentralization of three core components. The DCS is sent from the VM to a blockchain network that commits it to the blockchain. It is mathematically possible to send the DCS to a Directed Acyclic Graph "tangle", a secure database, private blockchain, XML document or any data base type storage facility. While the signing scheme is a good fit for blockchain technologies, it is not dependent on a blockchain.

The $C_{MR}$ is stored at the user's preferred location. To maximize value of the DCS process the $C_{MR}$ would typically be sent to a cloud storage server. The user may choose to keep the $C_{MR}$ on the VM, depending on downstream application. Keys K1, K2 remain on the VM, which will typically be set up on the local host I device used to access the encrypted recoded message $C_{MR}$ at some later date.

Developers, enterprise and users in general manage all encrypted recoded messages $C_{MR}$ and the corresponding digital control signature at the VM site. The client wallet 122 includes software to assist users in message signing, management, transfer and storage. Traditional wallets chiefly act as a "key ring", storing all necessary private key counterparts to blockchain resident derivatives of public keys as the mathematical basis to control coins or tokens. The client wallet 122, by contrast, must not only act as a token key ring, but as a DCS key ring as well. To hold DCS keys, the wallet must interact with the VM and best practice key management schemes to secure and retrieve DCS keys. $C_{MR}$ management also falls under wallet utility with more straightforward requirements.

VMs offer benefits to the overall DCS process, such as operating system independence, standardization, additional security and user access logs that provide an even stronger legal basis for data ownership. Wallet components dealing with logging into the wallet and signature rules are DCS signed and stored on the blockchain during VM and wallet installation.

These VM benefits set a firm foundation for forensic audits of message origin and non-repudiation. An extensive amount of VM customization will depend on application and enterprise user requirements. It is straightforward to install multiple VMs on one local device, with each VM separated from one another to manage separate operators.

Many worms, ransomware attacks and viruses exploit the fact that devices tend to have "root level" access. On a windows machine, access to the C:\root gives a user, bot, application, virus or other independent agent unilateral access to messages, files and device content. A novel use for VMs is to configure applications such as Photoshop® as client wallets, with DCS control over Photoshop® produced content on a Photoshop® dedicated VM.

Such a scenario would allow the application publisher to own and control all produced content and restrict access to specific application associated content. An adversary gaining "root level" access to the Photoshop® VM would not be able to compromise or affect content managed on a different application VM on the same local device. This implementation ends root level access in favor of application level access.

Figure 8:
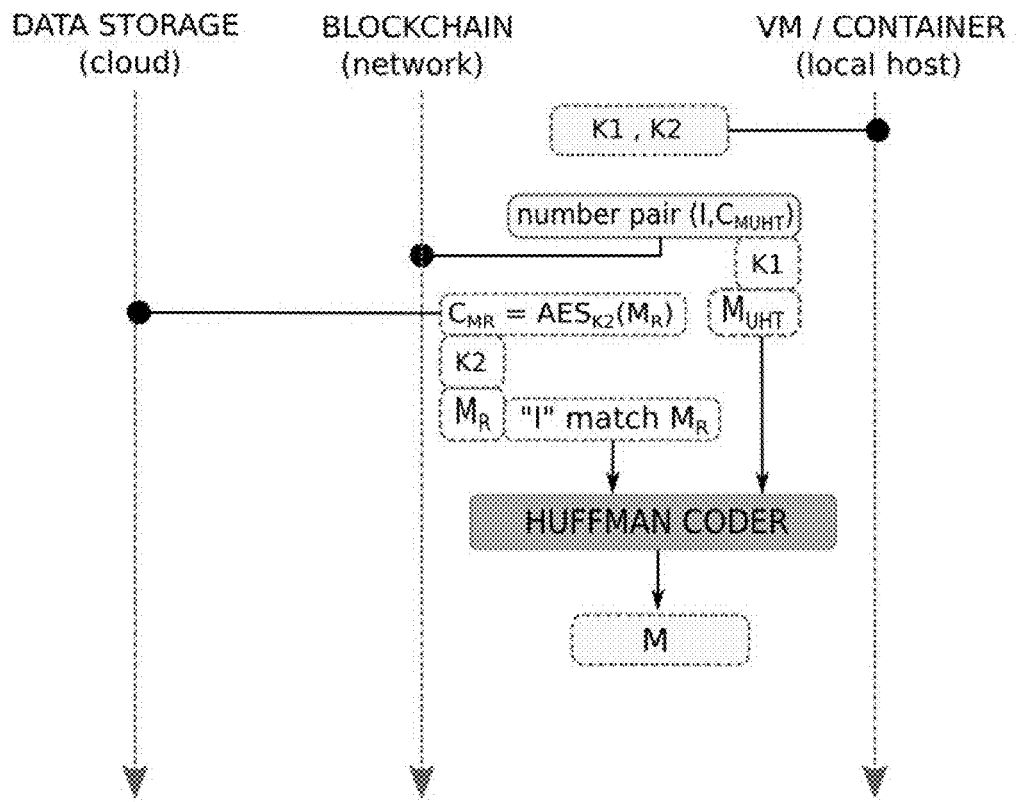
FIG. 8 illustrates data read processing operations performed in accordance with an embodiment of the invention.

The process of extracting a useful message—M—from the decentralized file form is shown in FIG. 8. FIG. 8 is effectively the reverse of the operations shown in FIG. 5. The process requires a controlled decryption, followed by a controlled decompression. This accessible useful content M is built on demand at the control point, and is not sent to some target destination.

Keys K1 and K2 are in the client wallet 122 on the local host (e.g., client machine 102_1), which may host a container based virtual machine. The number pair (I, $C_{MUHT}$) are retrieved from the block chain. K1 decrypts $C_{MUHT}$ to $M_{UHT}$, while K2 decrypts $C_{MR}$ to $M_R$. $C_{MR}$ optionally undergoes an appropriate integrity check (i.e., "I" match $M_R$). $M_R$ is then applied to Huffman decoding to secure M. The private key never needs to be disclosed at any point to the reading party. Therefore, while the reading party may access M ultimately, the reading party can never generate the signature.

International data privacy laws, such as the European General Data Privacy Regulation (GDPR) which came into effect in May 2018, confer more and more data rights to users regarding data privacy. Chiefly, such legislation insists on greater client-enterprise transparency detailing how client data will be used, what client data will be stored, and most importantly the right for a user to actively know what data has been collected and to demand the right for such data to be forgotten. The right to be forgotten is specifically significant for blockchain technologies attempting to store private information such as user identity, sensitive health records, smart contracts and other personal information.

Failure to comply with GDPR could cost a company up to 4% of its annual turnover for a single incident and so far, because of the permanence and public broadcast of blockchain ledgers in traditional blockchain technologies, there is no recognized method for blockchain providers to offer users the autonomous right to be forgotten.

The disclosed DCS solution is eloquent because while the DCS is stored on a blockchain and can never be forgotten, the $C_{MR}$ exists off-chain and can be deleted by the message owner from the VM.

Deleting the $C_{MR}$ makes any possible attempt to rebuild M strictly impossible. Thus DCS signed messages can be permanently forgotten. With on-chain offerings it is impossible to offer a client the right to be forgotten, and with a hash based off-chain signature (such as employed by Ethereum) it is possible (in theory, but not practically) to brute force and test all string combinations to identify what message will build a particular hash that was stored on the blockchain, even if the original off-chain message has been deleted.

With the presented DCS, without $C_{MR}$ it is physically impossible to rebuild M. From knowledge of just K1, K2 and $C_{MUHT}$ it is impossible to generate the correct unique M originally signed for, even if attempting brute force analysis. Thus, the DCS provides data control through authentication, non-repudiation, integrity, twin resolution and message access, while allowing the blockchain based right to be forgotten and a state of default data privacy in accordance with the specifications "Council of the European Union, European Parliament. GDPR. Regulation (EU) 20161679 of the European Parliament and of the Council of 27 Apr. 2016 on the protection of natural persons with regard to the processing of personal data and on the free movement of such data, and repealing Directive 95I46IEC (General Data Protection Regulation). IMMC: PE 17 2016. INIT CELEX: 32016R0679. OJ: JOL_2016_119_R_0001. 27 Apr. 2016."

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A non-transitory computer readable storage medium with instructions executed by processors to:
receive an original collection of symbols at a first machine operative as a coding machine in a network, where the original collection of symbols is conveyed via the network from a second machine operative as a client machine in the network;
apply at the first machine a single use coding function to the original collection of symbols to form a new collection of symbols, where the first machine subsequently applies a different single use coding function to the original collection of symbols to form a different new collection of symbols recoverable as the original collection of symbols;
form encryption keys associated with a user of the client machine and convey via the network the encryption keys to a client wallet on the second machine;
encrypt the new collection of symbols to form a recoded encrypted symbol file and convey via the network the new collection of symbols for storage at a third machine in the network;
form a distributed ledger entry with a data control signature formed using the single use coding function encrypted with a private key of the encryption keys;
write the distributed ledger entry to a fourth machine in the network, where the fourth machine is a node in a distributed ledger;
access the distributed ledger entry at the fourth machine;
read from the third machine the recoded encrypted symbol file; and
utilize the data control signature formed using the single use coding function encrypted with the private key and a symmetric key to convert the recoded encrypted symbol file to the original collection of symbols.

2. The non-transitory computer readable storage medium of claim 1 wherein the data control signature is configured to enforce authentication, non-repudiation, integrity, twin resolution and message access for the original collection of symbols.

3. The non-transitory computer readable storage medium of claim 1 wherein the data control signature includes a data integrity value.

4. The non-transitory computer readable storage medium of claim 1 wherein the data control signature is formed with a symmetric encryption function.

5. The non-transitory computer readable storage medium of claim 1 wherein the data control signature is formed with an asymmetric encryption function.

6. The non-transitory computer readable storage medium of claim 1 further comprising instructions executed by the processor to apply an integrity function to the recoded encrypted symbol file to confirm data immutability.

7. The non-transitory computer readable storage medium of claim 1 wherein the coding function is a Huffman tree.

8. The non-transitory computer readable storage medium of claim 1 wherein the coding function is an auto-encoder.

9. The non-transitory computer readable storage medium of claim 1 wherein the coding function is symmetric encryption.

10. The non-transitory computer readable storage medium of claim 1 wherein the coding function includes the addition of random data to the original collection of symbols.

11. The non-transitory computer readable storage medium of claim 1 hosted on a container based virtual machine.

* * * * *